United States Patent [19]

Simpson

[11] 4,043,352

[45] Aug. 23, 1977

[54] PRESSURE ACCUMULATOR

[76] Inventor: Alden H. Simpson, 54 Pine Grove St., Springfield, Mass. 01119

[21] Appl. No.: 712,035

[22] Filed: Aug. 5, 1976

[51] Int. Cl.² .............................................. F16L 55/04
[52] U.S. Cl. ......................................... 138/31; 138/30; 220/85 B
[58] Field of Search ................ 138/30, 31; 92/92, 107, 92/130 B; 220/85 B

[56] References Cited

U.S. PATENT DOCUMENTS

| | | | |
|---|---|---|---|
| 1,340,846 | 5/1920 | Veenschoten | 92/92 X |
| 3,028,881 | 4/1962 | Koomey et al. | 138/30 |
| 3,351,097 | 11/1967 | Moran | 138/31 X |
| 3,749,165 | 7/1973 | Heaton | 138/30 X |

FOREIGN PATENT DOCUMENTS

| | | | |
|---|---|---|---|
| 946,668 | 1/1964 | United Kingdom | 138/30 |
| 618 | 1888 | United Kingdom | 138/30 |

Primary Examiner—Richard E. Aegerter
Assistant Examiner—James E. Bryant, III
Attorney, Agent, or Firm—Norman S. Blodgett; Gerry A. Blodgett

[57] ABSTRACT

Pressure accumulator consisting of an open-ended cylinder containing a tensioned elastic sleeve fastened to the open-end of the cylinder in which lies an open-ended vessel, the vessel being slideably carried on a post whose free end carries a piston which is slideable on the inside of the vessel.

5 Claims, 2 Drawing Figures

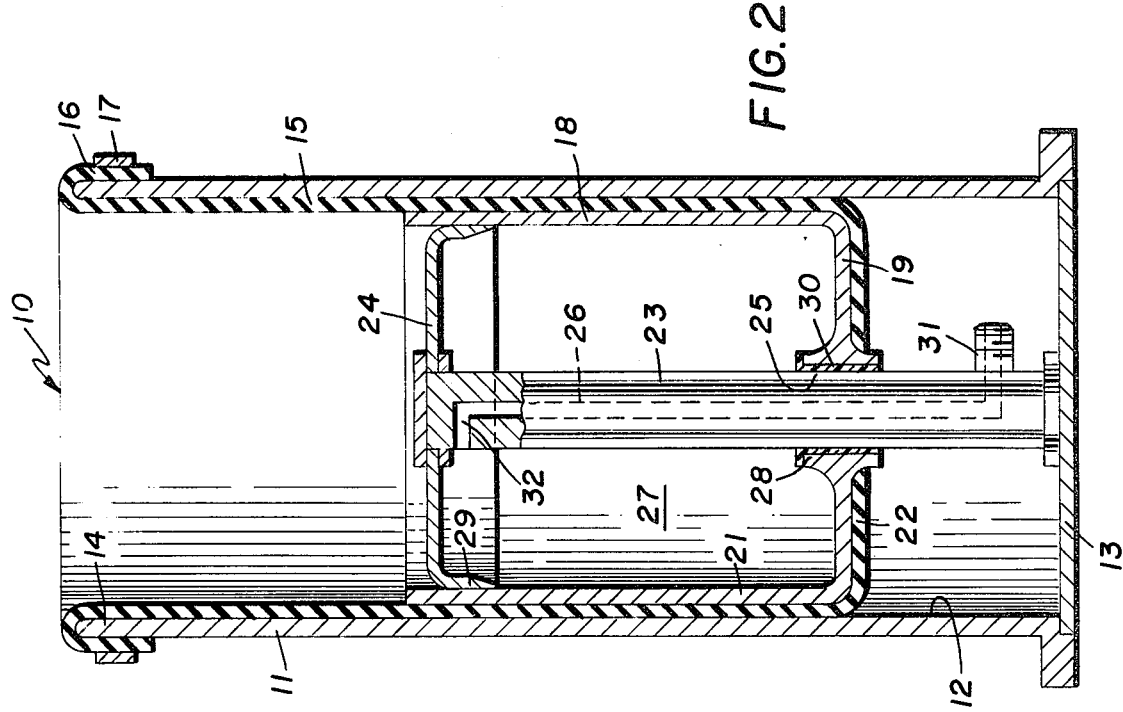
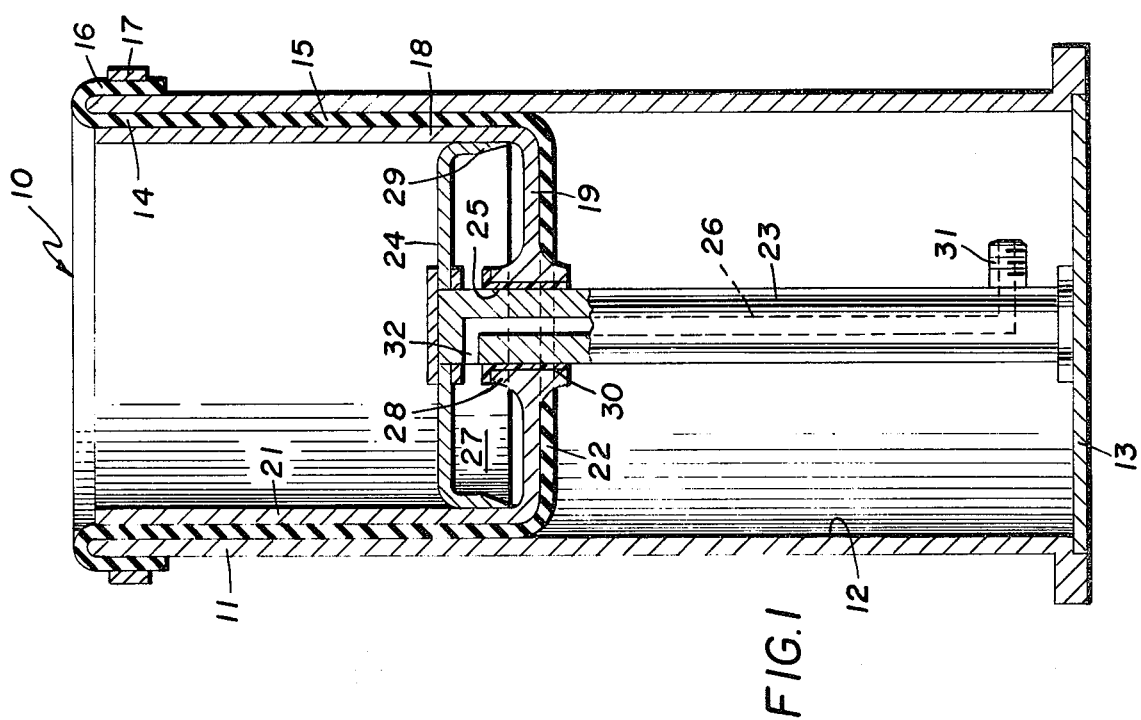

PRESSURE ACCUMULATOR

BACKGROUND OF THE INVENTION

In the operation of hydraulic and pneumatic systems, it is necessary to use a device for the storage of pressure fluid. Such a device, commonly known as a "pressure accumulator", serves to smooth out the variations in the pressure in a fluid system by receiving fluid at a time of high pressure and discharging it at a time of low pressure; this seems to maintain the flow of fluid at a generally constant value in the same way that a capacitor operates in an electrical system. In some cases the accumulator consists of a piston moveable in a cylinder, the movement being resisted by a coil spring; this type has the deficiency of having a tendency to leak. Some versions of the piston-type accumulator have used diaphragms to prevent the leakage, but the diaphragms used in this way tend to bind and tear. Furthermore, the need for precision-fitting pistons and cylinders makes the cost of the accumulator quite high and prevents its use in inexpensive installations where the presence of such a device could be very useful. These and other difficulties experienced with the prior art devices have been obviated in a novel manner by the present invention.

It is, therefore, an outstanding object of the invention to provide a pressure accumulator for use in inexpensive fluid systems.

Another object of this invention is the provision of a pressure accumulator making use of the excellent elastic properties of natural rubber.

A further object of the present invention is the provision of a pressure accumulator that does not require accurate piston-cylinder surfaces and in which most of the parts can be produced by deep-drawing of sheet metal.

It is another object of the instant invention to provide a pressure accumulator which is simple in construction, inexpensive to manufacture, and which is capable of a long life of useful service with a minimum of maintenance.

It is a further object of the invention to provide a pressure accumulator which does not use a mechanical spring and which has a novel manner of guiding the piston and cylinder without providing them with finely finished surfaces.

It is still a further object of the present invention to provide a pressure accumulator which is capable of accommodating to a substantial amount of misalignment of the parts.

With these and other objects in view, as will be apparent to those skilled in the art, the invention resides in the combination of parts set forth in the specification and covered by the claims appended hereto.

SUMMARY OF THE INVENTION

In general, the present invention consists of a pressure accumulator provided with a cylinder which is open at one end, which is provided with a closure at the other end, and which has a cylindrical inner surface. A natural rubber bag lies within the housing with its edge fixed to the said open end of the housing, and a cup-shaped vessel lies within the housing and within the bag. The vessel has a flat bottom extending across the housing and has a tubular side wall. Substantial portions of the bag are located between the said cylindrical surface of the housing and the outer surface of the tubular side wall. The bottom of the bag lies against the outer surface of the bottom of the vessel. A post is fixed to the closure at the said one end of the vessel and extends axially of the cylindrical surface. The post extends through an aperture in the bottom of the bag and of the vessel and a piston is fixed to the free end of the post with its outer periphery slideably engaging the inner surface of the vessel.

More specifically, a passage for the introduction of pressure fluid extends through the post and opens into the chamber defined by the said piston and the inner surface of the vessel. The bottom of the vessel is provided with a substantial hub providing a cylindrical bushing which is freely slideable on the post.

BRIEF DESCRIPTION OF THE DRAWINGS

The character of the invention, however, may be best understood by reference to one of its structural forms, as illustrated by the accompanying drawings, in which:

FIG. 1 is a vertical sectional view of a pressure accumulator embodying the principles of the present invention, and FIG. 2 is a similar vertical sectional view of the pressure accumulator showing it in loaded condition.

DESCRIPTION OF THE PREFERRED EMBODIMENT

Both FIGS. 1 and 2 show all of the features of the invention. The pressure accumulator, indicated generally by the reference numeral 10, is shown as having an elongated main housing 11 with a cylindrical inner surface 12 which terminates at one end in a closure 13, but is provided with an open end 14 at the other end. An elastomer bag 15 lies within the housing and has its edge 16 attached to the outer surface of the open end of the housing by fasteners 17. The bag is preferably turned back over the top edge of the cylinder and fastened on the exterior thereof. In the preferred embodiment, the bag is made of natural rubber which is very elastic.

An open-ended vessel 18 lies within the bag 15 and within the housing 11. The vessel has a flat bottom 19 which extends across the housing perpendicular to its axis and the vessel also has a tubular side wall 21. Substantial portions of the elastomer bag 15 lying between its edge 16 and its bottom 22 are located in the space between the said inner cylindrical surface 21 of the vessel. The bottom 22 of the bag lies against the outer surface of the bottom 19 of the vessel.

A post 23, having a circular cylindrical outer surface, is fastened to the center of the closure 13 of the vessel and extends axially through the vessel. The post extends through an aperture 25 in the bottom of the bag and a bored hub 28 at the bottom of the vessel. A piston 24 is attached to the free end of the post 23 and its outer periphery slides smoothly along the inner surface of the vessel 18. A seal 30 resides in the bore in the hub 28 and the post slides smoothly in this seal.

The piston 24 consists of an open-ended vessel whose opening faces in the opposite direction to the vessel 18 in which it resides. The piston has a side wall 29 which is very much shorter in the axial direction than the side wall 21 of the vessel 18 and is provided with a beveled edge.

The operation and the advantages of the invention will now be readily understood in view of the above description. The pressure accumulator 10 is connected into a fluid system, such as a hydraulic circuit, by connecting the nipple 31 at the base of the post 23 to the system. Hydraulic pressure, therefore, makes itself felt through the passage 26 and its opening 32 into the chamber 27 which lies between the piston 24 and the vessel 18. Hydraulic pressure in the chamber 27 presses the vessel 18 downwardly, the piston 24 remaining in place in a fixed position. The pressure fluid in the chamber 27 remains in place without leakage because of the close fit between the outer cylindrical surface of the tubular wall 29 of the skirt, as it slides in the inner cylindrical surface of the wall 21 of the vessel. As the vessel 18 moves downwardly within the housing 11, it causes the side wall of the elastomer bag 15 to stretch, the exact amount being, of course, proportional to the pressure in the hydraulic fluid in the chamber 27. As a matter of fact, the total force stored in the stretched rubber is equal to the pressure multiplied by the area of the bottom 19 of the vessel 18.

Because the vessel is firmly cradled in the elastomer bag, it is capable of a degree of lateral movement because of the compressibility of the layer of elastomer that lies between the vessel and the inner surface of the housing 11. This slight lateral movement gives it a degree of adaptability that is particularly useful. The piston 24, residing as it does at the top of the post 23, is also capable of a slight lateral movement because of the cantilevered nature of the post. This means that slight irregularities in the piston and slight irregularities in the vessel, as well as irregularities in the inner surface of the housing, are easily compensated for in the present structure. It is not necessary, for instance, that the inner surface of the tubular wall 21 of the vessel 18 be a perfect cylinder. Any slight meandering of this surface will be compensated for by lateral movement of the piston at the top of its somewhat flexible post and by the slight permissible lateral movement of the vessel due to compression of the layer of rubber lying between its outer surface and the inner surface of the housing. The interesting feature is that the bending of the post is a resilient bending which causes it, of course, to return to its original central axial position and the lateral stressing of the wall of the bag acts in a similar way. That is to say, the stressing of the rubber wall causes the vessel to return to its central axial position when the lateral force has been relieved. This makes it possible to construct the device relatively inexpensively, since no finely-machined surfaces are necessary. An interesting feature of the invention is that the vessel 18 is guided in its vertical motion on the post 23, the cylindrical outer surface of the post 23 sliding smoothly in the bushing in the hub 28 which causes the motion of the vessel 18 relative to the piston 24 to be smoothly guided by these relatively simple wear-free surfaces, rather than by the sealing surfaces between the tubular wall 29 of the piston and the tubular wall 21 of the vessel. Note that any leakage around the piston is retained in the upwardly-directed cavity formed by the inside of the vessel and the rubber bag as well as the piston itself; what little leakage does take place in this upper direction is retained in this cavity and can be removed, if necessary, from time-to-time when it is convenient, rather than running out into the working area.

The invention, therefore, provides a very simple and rugged construction which will wear very little. The stretching of the bag provides a constant smooth energy-retention source, so that the energy introduced by excessive pressure of hydraulic fluid is returned to the system in a smooth even manner.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A pressure accumulator, comprising
   a. a main housing having a cylindrical inner surface, having a closure at one end and open at the other,
   b. an elastomer bag lying within the housing with an edge fixed to the said open end thereof,
   c. an open-ended vessel lying within the housing having a flat bottom extending across the housing and having a tubular side wall, substantial portions of the bag being located between the said cylindrical surface of the housing and the outer surface of the tubular side wall, the bottom of the bag lying against the outer surface of the bottom of the said vessel,
   d. a post which is fixed to the closure at the said one end of the housing and which extends axially of the said cylindrical surface, the post extending through an aperture in the bottom of the bag and of the vessel,
   e. a piston fixed to the free end of the post and having its outer periphery slideably engaging the inner surface of the vessel, and
   f. means for the passage of pressure fluid into the chamber defined by the said piston and the inner surface of the said vessel.

2. Pressure accumulator as recited in claim 1, wherein the elastomer bag is formed of rubber.

3. Pressure accumulator as recited in claim 1, wherein the means for the introduction of pressure fluid is a passage which extends through the post and opens into the chamber defined by the said piston and the inner surface of the said vessel.

4. Pressure accumulator as recited in claim 1, wherein the bottom of the vessel is provided with a substantial hub, the said aperture defined by a cylindrical seal which is freely slideable on the post.

5. Pressure accumulator as recited in claim 1, wherein the piston consists of an open-ended vessel whose opening faces toward the bottom of the said vessel, but having a side wall that is substantially shorter in axial extent than that of the side wall of the said vessel.

* * * * *